United States Patent
Alb et al.

(10) Patent No.: US 6,760,391 B1
(45) Date of Patent: Jul. 6, 2004

(54) METHOD AND APPARATUS FOR LINE RATE CONTROL IN A DIGITAL COMMUNICATIONS SYSTEM

(75) Inventors: Cristian Alb, Nepean (CA); Jerzy Matuszewski, Kanata (CA); Thomas P. Taylor, Stittsville (CA); Michael J. Slonosky, Nepean (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/395,734

(22) Filed: Sep. 14, 1999

(51) Int. Cl.[7] .................................................. H04L 7/00
(52) U.S. Cl. ..................... 375/354; 375/219; 375/225
(58) Field of Search ................................. 375/219, 220, 375/222, 225, 227, 257, 278, 285, 295, 316, 354; 370/230, 231, 235, 252, 465; 379/93.01, 93.05, 93.08, 106.06

(56) References Cited

U.S. PATENT DOCUMENTS

| | | | | |
|---|---|---|---|---|
| 4,841,526 A | * | 6/1989 | Wilson et al. | 714/708 |
| 5,007,047 A | * | 4/1991 | Sridhar et al. | 370/286 |
| 5,121,388 A | * | 6/1992 | Perdikaris et al. | 370/401 |
| 5,524,122 A | * | 6/1996 | Lepitre et al. | 375/222 |
| 5,754,586 A | * | 5/1998 | Carsello | 375/213 |
| 5,802,105 A | * | 9/1998 | Tiedemann et al. | 375/225 |
| 5,812,786 A | * | 9/1998 | Seazholtz et al. | 370/465 |
| 5,822,318 A | * | 10/1998 | Tiedemann et al. | 370/391 |
| 5,825,761 A | | 10/1998 | Tanaka et al. | |
| 5,862,451 A | * | 1/1999 | Grau et al. | 348/192 |
| 5,943,364 A | * | 8/1999 | Yoshida | 375/222 |
| 6,023,453 A | * | 2/2000 | Ruutu et al. | 370/229 |
| 6,112,232 A | * | 8/2000 | Shahar et al. | 370/465 |
| 6,215,793 B1 | * | 4/2001 | Gultekin et al. | 370/464 |
| 6,351,487 B1 | * | 2/2002 | Lu et al. | 370/252 |
| 6,393,051 B1 | * | 5/2002 | Koizumi et al. | 370/465 |

FOREIGN PATENT DOCUMENTS

WO     WO 96/36150     11/1996

* cited by examiner

Primary Examiner—Chi Pham
Assistant Examiner—Khanh Cong Tran

(57) ABSTRACT

A method and communications device for controlling the line rate used on a communications link. The method includes receiving frames of digital information, computing a measure of the number of frames received in error in a sliding time window and generating a command to change the line rate as a function of the measure. The use of a sliding time window captures variations in the line quality over an extended period of time; thus, significant disturbances which might otherwise be missed are captured. The measure of the number of frames received in error is computed by applying a many-to-one mapping to the actual number of frame errors received since a previous sampling instant; thus, insignificant short-term disturbances which might otherwise temporarily corrupt the line quality estimate are eliminated. As a result, commands to change the line rate are based on a better estimate of line quality and the incidence of thrashing in the presence of recurring noise bursts is reduced, leading to increased data throughput. A back-off timer may be used for preventing an upgrade in line quality from occurring immediately following a downgrade, further decreasing the incidence of thrashing.

23 Claims, 10 Drawing Sheets

METHOD AND APPARATUS FOR LINE RATE CONTROL IN A DIGITAL COMMUNICATIONS SYSTEM

FIELD OF THE INVENTION

The present invention relates to digital communications systems and, more particularly, to methods and apparatus for controlling the downstream and upstream line rate in such systems.

BACKGROUND OF THE INVENTION

The availability of Internet access to virtually any household equipped with a computer and a telephone line has brought about an explosion of research and development in the field of digital communications. One of the key problems facing designers today is that of carrying as much data as possible, in an error-free manner, within the relatively narrow confines of copper twisted pairs traditionally used for carrying analog voice signals.

By employing sophisticated modulation techniques and frequency ranges which sometimes exceed 20 MHz, it has been possible to achieve downstream line rates in excess of 1 megabit per second (Mbps) over standard local loops under low noise conditions. Unfortunately, one of the consequences of employing such high data rates is that even brief degradations in the quality of the transmission medium can result in the loss of large amounts data. Temporary degradations of this kind, which range in duration from microseconds to seconds, may result from machinery being turned on at the customer premises or from electric disturbances due to lightning having been coupled into the transmission medium.

Thus, designers of communications systems have been forced to develop mechanisms which allow the line rate to be adjusted according to the quality of the loop (or "line"). Currently, the most common indicator of loop quality is signal-to-noise ratio (SNR), on the basis of which the line rate is upgraded or downgraded. More specifically, an SNR measurement device is used to accumulate line quality measurements over a length of time on the order of several milliseconds. Typically, the SNR measurement device is sampled periodically, and the line rate is downgraded if the sampled value of the SNR indicates poor line quality or is upgraded if the sampled value of the SNR indicates good line quality.

The conventional approach to assessing the quality of the line is to periodically sample the SNR measurement device. However, short-term disturbances on the line may not be caught if the SNR measurement device is sampled in this manner. In other words, by the time the SNR measurement device is sampled, a short-term noise burst (e.g., impulse noise) may be gone and the SNR may have improved. However, the impulse noise may have managed to corrupt several frames of data to such a severe degree that the frames would have to be discarded and re-transmitted. Re-transmitted frames could similarly be affected by subsequent impulsive noise bursts on the line. The net result is that the achievable data throughput is much lower than the line rate, despite the fact that the SNR measurement device, when sampled, reports good SNR on the line.

In another scenario, low data throughput may result from sampling the SNR measurement device during a noise burst which is not sufficiently long to corrupt frames of data to the point beyond which they are unrecoverable. For example, let it be assumed that under initial conditions, an acceptable SNR is measured, allowing the line rate to be increased. Let it then be assumed that a very short noise burst hits the line. If the SNR measurement device is sampled at the end of that burst, then the reported SNR may indicate poor line quality and, using conventional methods, the line rate may be lowered. However, the next time the SNR measurement device is sampled, the line quality might-be found to have improved and the line rate may be increased again.

This causes low data throughput in two ways. Firstly, there is clearly a reduction in the data throughput during the time when the data rate is lower than necessary. Secondly, a delay due to synchronization considerations is induced each time the line rate is changed. Thus, the unnecessary and frequent toggling between higher and lower line.rates, known as "thrashing", reduces the data throughput during the period of time surrounding each line rate change.

Moreover, those skilled in the art will appreciate that the problems associated with both of the above scenarios (failing to detect important noise bursts or reacting to insignificant noise bursts) are exacerbated when the noise bursts in question are recurring in time.

Thus, there is a need in the industry to provide a line rate adjustment mechanism which allows a high data throughput to be maintained and the incidence of thrashing to be reduced.

SUMMARY OF THE INVENTION

The invention can be summarized as a method of monitoring the quality of a communications link used to transmit frames of digital information at a controllable line rate. The method includes the steps of receiving frames of digital information, computing a measure of the number of frames received in error in a sliding time window and generating a command to change the line rate as a function of the measure. The command can then be used to change the line rate locally or it can be sent to a remote communications device, where a line rate adjustment is made. The method of the invention is implementable by a communications device such as a modem. Instructions for executing the method of the invention may be stored on a computer-readable medium which may be readable by the baseband digital interface of the communications device.

Preferably, the sliding time window is subdivided into intervals separated by sampling instants. An error counting element, such as an error count register, is sampled periodically and the number of new.errors between two successive sampling instants is converted into another value using a many-to-one mapping.

Preferably, commands to decrease the line rate trigger the start of a back-off timer. A command to increase the line rate cannot be generated until the back-off timer has expired. Preferably, the expiry time of the back-off timer is increased if the generation of a decrease command closely follows the generation of an increase command and is decreased if the generation of a decrease command occurs a long time after the generation of an increase command. The amount of time that has elapsed since the generation of an increase command can be tracked by a redemption timer.

The use of a sliding time window captures variations in the line quality over an extended period of time. Thus, it is possible to capture significant disturbances which might be missed if conventional SNR-based measurements are relied upon. As a result, the line rate will be downgraded in situations where it should be downgraded but where, conventionally, it may not have been. This leads to higher data throughput as the transmitted data will be less prone to corruption at the lower rate.

Furthermore, the use of the many-to-one mapping eliminates insignificant short-term disturbances, with the result that the line rate will not be downgraded in situations where it should not be downgraded but where, conventionally, it may have been. This leads to a reduced incidence of thrashing, which further results in higher data throughput as less time is lost in preparing for line rate changes.

Moreover, the back-off timer prevents an upgrade in line quality to follow directly on the heels of a downgrade, further decreasing the incidence of thrashing and further improving the data throughput.

In addition, the redemption timer causes the expiry of the back-off timer to be increased if the line rate, once upgraded, does not stay acceptable for more than the duration of the redemption timer. This has the advantage of further reducing the incidence of "thrashing" in cases where the line rate is consistently poor but undergoes occasional improvements, leading to improved data throughput.

BRIEF DESCRIPTION OF THE DRAWINGS

These and other aspects and features of the present invention will now become apparent to those of ordinary skill in the art upon review of the following description of specific embodiments of the invention in conjunction with the accompanying drawings, in which.

DETAILED DESCRIPTION OF THE PREFERRED EMBODIMENT

Figure 1:
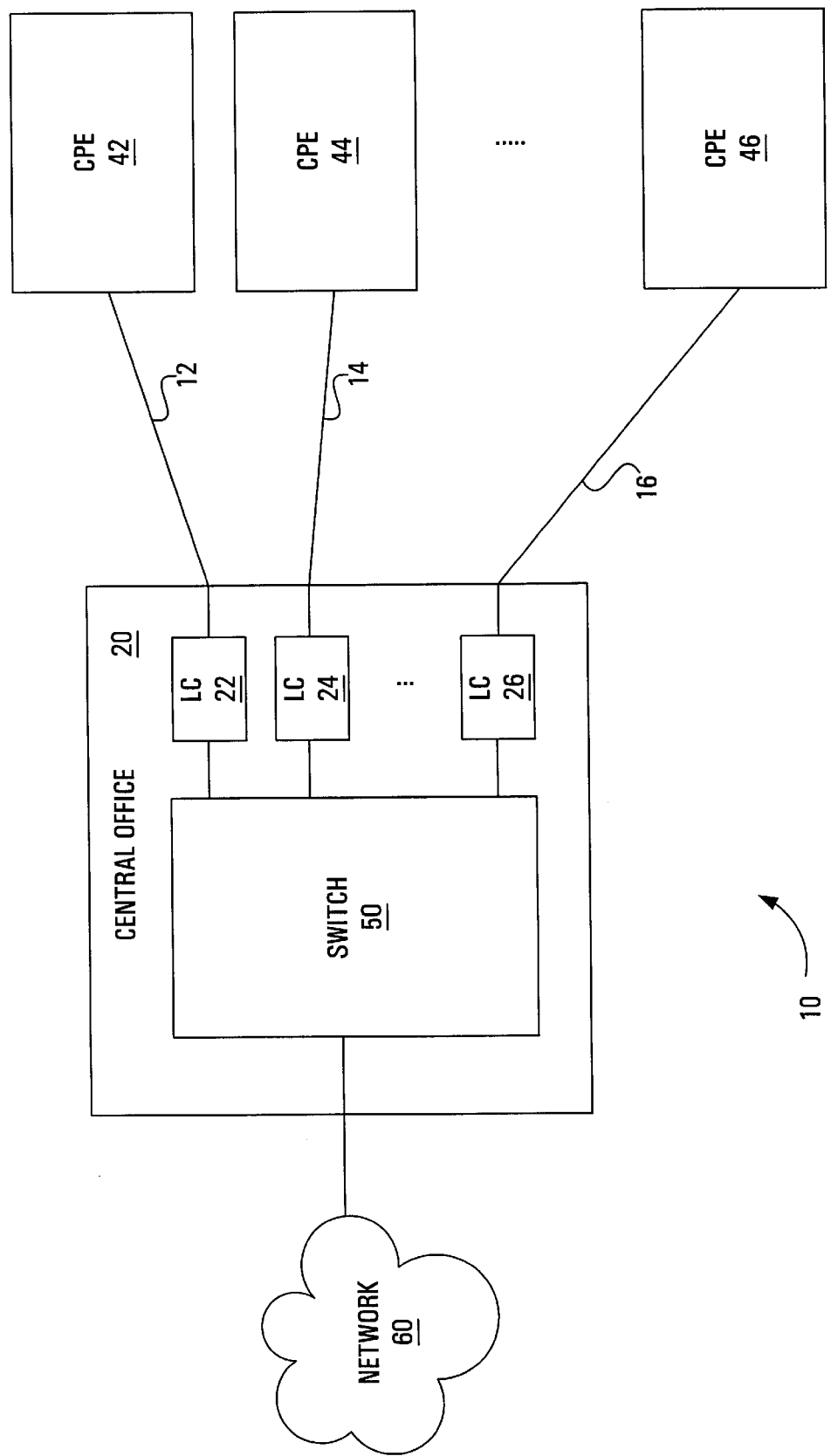
FIG. 1 is a high-level block diagram of a communications system involving a central office (CO) communicating with a plurality of customer premises equipment (CPE) units.

With reference to FIG. 1, there is shown a communications system in which a set of physical communication links 12, 14, 16 is used to connect respective interface cards 22, 24, 26 located in a central office (CO) 20 to respective customer premises equipment (CPE) units 42, 44, 46. Each interface card 22, 24, 26 is also known as a "line" card and preferably constitutes part of a respective modem at the CO 20. The interface cards 22, 24, 26 may also be embodied as a single interface card at the central office 20, with some functionality remaining separate so as to provide independent control of the individual upstream and downstream line rates on each loop. Similar interface cards may exist within modems in the CPE units 42, 44, 46.

The CO line cards 22, 24, 26 are connected to a switch 50 in the CO 20. The switch 50 is further connected to a network 60 such as the public switched telephone network (PSTN) or a data network cloud. The CPE units 42, 44, 46 are usually located in or around subscribers' homes and are typically connected to communications devices such as telephones or personal computers.

The direction of communication from the CO to the CPE units 42, 44, 46 is known as the downstream direction and the opposite direction of communication is referred to as the upstream direction. Typically, but not necessarily, the same link 12, 14, 16 is used for both downstream and upstream communication, in which case separate frequency ranges may be used for transmitting signals in both directions. Alternatively, a time-division multiplexing scheme could be used, whereby the upstream and downstream directions of communication share the same frequency band on the same medium but access it at different times.

The present invention is particularly suited to improving data throughput and lowering the incidence of thrashing on narrowband communication links such as copper twisted pairs commonly used in local telephone loops. Nevertheless, it should be understood that the links 12, 14, 16 between the CO and the CPE units 42, 44, 46 can be made up of wider-bandwidth physical media such as coaxial cable, optical fiber and radio.

The signal exchanged in either the upstream or the downstream direction along each link 12, 14, 16 consists of a digitally modulated data stream. More specifically, a modulator periodically draws bits from a digital data stream, groups them together and modulates them according to a modulation scheme to produce a "symbol" which is then transmitted across the respective link. The number of bits used to generate a symbol is known as the modulation level and the number of symbols per second produced by the modulator is known as the symbol rate.

Suitable modulation schemes include quadrature amplitude modulation (QAM), discrete multi-tone (DMT) or carrierless amplitude and phase (CAP) modulation. In the case of quadrature amplitude modulation (QAM), a sinusoid is modulated by an amplitude specified by a first group of bits and is added to a cosinusoid modulated by an amplitude specified by a second group of bits, resulting in the generation of a symbol. The two groups of bits can be drawn from the same digital data stream intended for transmission across the link. The total number B of bits per symbol is related to the modulation level N by $B=\log_2 N$. Thus, in the case of 16-QAM (QAM having a modulation level of 16), 4 bits are used for each symbol as $\log_2 16$ is equal to 4.

The bit rate resulting from using a particular modulation level and a particular symbol rate is known as the line rate. For example, a 64 ksymbol/s 16-QAM signal delivers a 256 kbps line rate. By keeping the same symbol rate, the line rate can be altered by changing the modulation level. Alternatively, the line rate can be altered by keeping the same modulation level but changing the symbol rate. In still other embodiments, the line rate can be changed by altering both the symbol rate and the modulation level.

Therefore, depending on the symbol rate and on the modulation level, different line rates can be achieved. This relationship among the symbol rate, the modulation level and the line rate is inherent to all digital modulation schemes, including QAM, DMT and CAP. Although QAM is the example used for purposes of illustration in the following description, the actual modulation type used has no effect on the principles governing the way in which the invention works.

Figure 2:
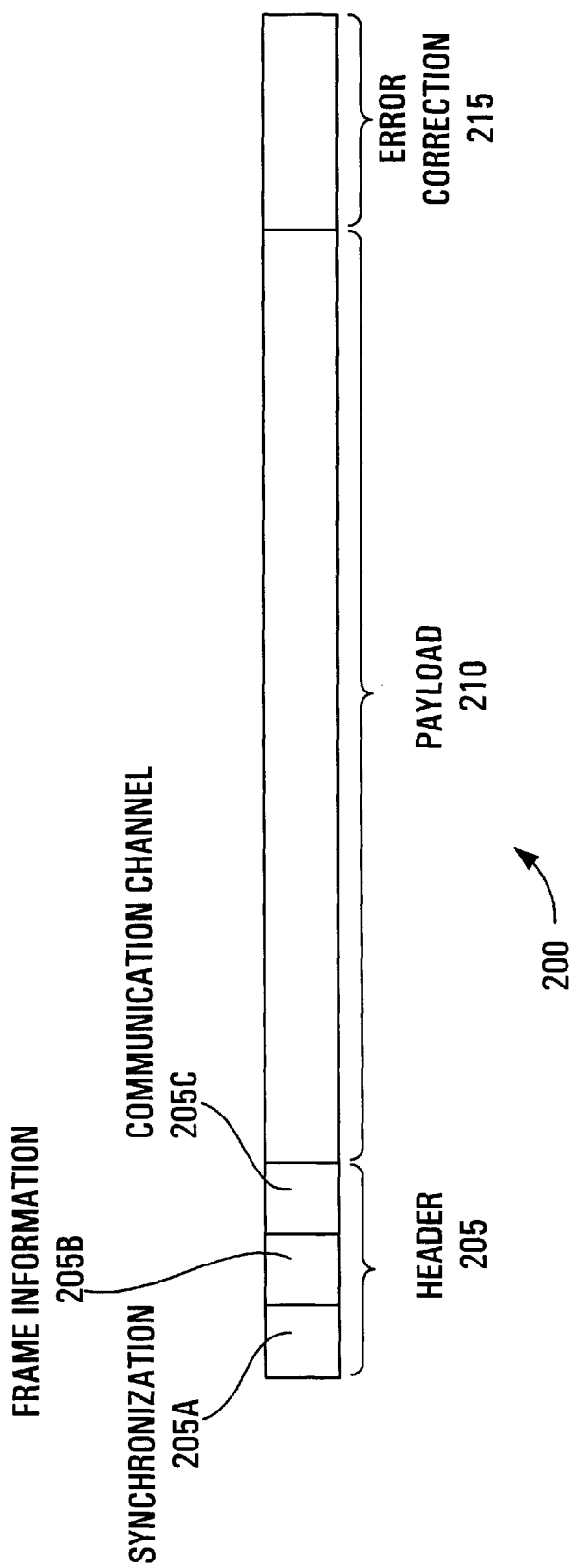
FIG. 2 illustrates the frame format of downstream and upstream frames exchanged between the CO and the CPE units.

The digital data stream intended for transmission in the downstream or upstream direction preferably consists of a sequence of frames as now described with reference to FIG. 2. Each frame 200 preferably contains 2016 bits, subdivided into a 40-bit header field 205, a 1968-bit payload field 210 and an 8-bit error correction field 215. The number of fields and the number of bits in each field are of no particular importance. In fact, even a variable-length frame could be used. Also, the relative position of each field within the frame is not important.

The header field 205 is preferably subdivided into an 18-bit synchronization field 205A, a 6-bit frame information field 205B and a 16-bit communication channel field 205C. The synchronization field 205A can be used for modem synchronization and frame delineation. The frame information field 205B can be used to convey modem status and diagnostic information. The communication channel field 205C can be used for transmitting SNR and frame error count information to a recipient modem or for instructing the recipient modem to change its line rate.

The payload field 210 comprises digital data coming from the network 60 or from the end user of the CPE units 42, 44, 46, depending on the direction of communication. For the purposes of understanding the present invention, it is not important to know whether this data is originally transmitted data or re-transmitted data. The task of ensuring end-to-end transmission of an original data stream, including the generation and interpretation of re-transmission requests, is left to upper layers of end user protocol stacks used by the communicating modems.

Finally, the error correction field 215 contains the result of a mathematical operation preferably performed on the bits in the payload field 210 and the communication channel field 205C.

As will be described herein below, the present invention deals with monitoring the line quality and adjusting the downstream and/or upstream line rates as a function thereof. Preferably, although line quality measurements are made at both the CO modem and the CPE modem, only one of the modems (known as the "master" modem) generates commands instructing both.itself and the other modem (known as the "slave" modem) to adjust their respective line rates. In the preferred embodiment of the invention, the CO modem is the master modem and the CPE modem is the slave modem. Nevertheless, it is possible to envisage an embodiment of the invention in which the CPE modem is the master or in which both the CO modem and the CPE modem generate commands to instruct the other to change its respective line rate.

Figure 4:
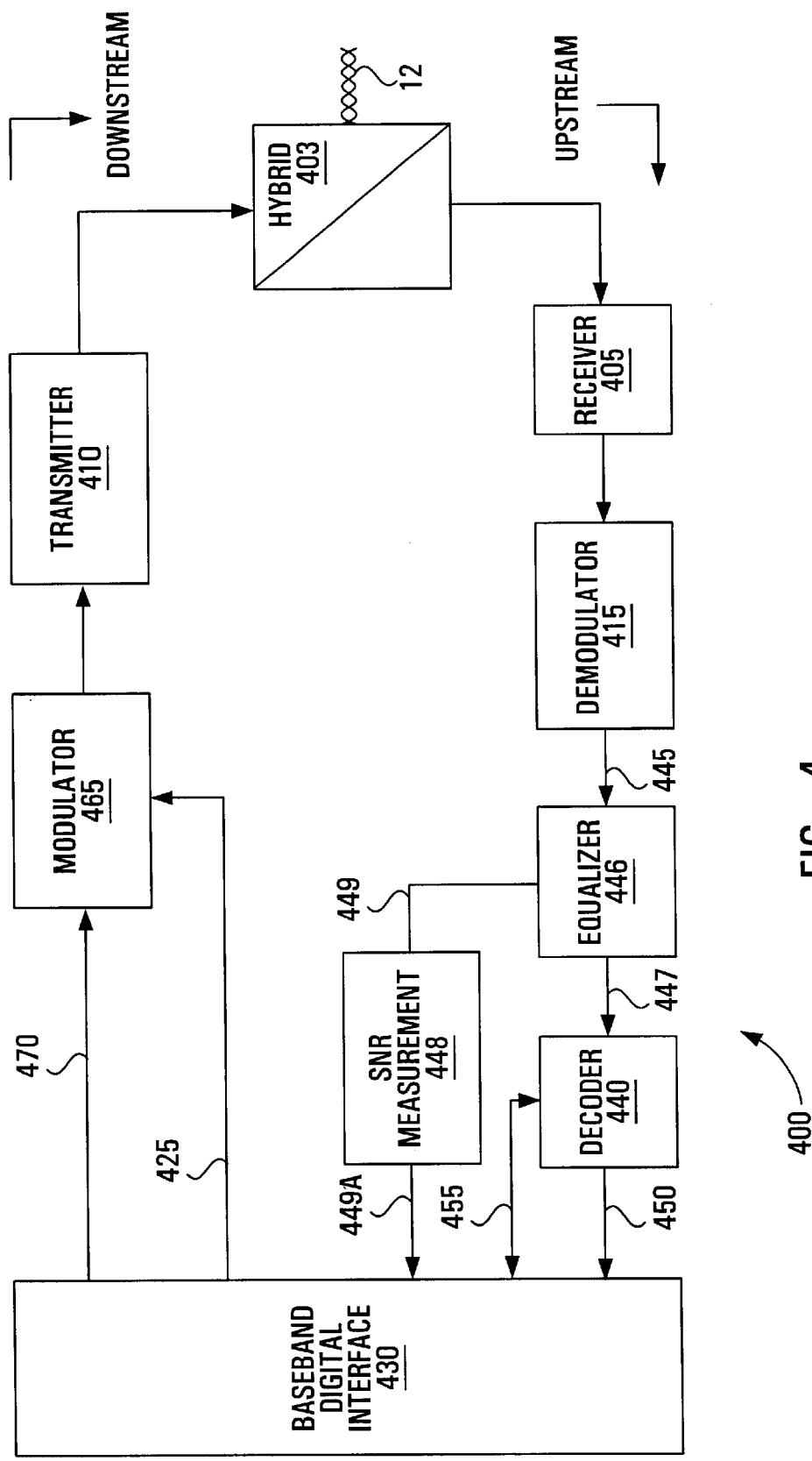
FIG. 4 is a detailed block diagram of a CO modem.

Reference is now made to FIG. 4, which shows in greater detail an internal block diagram of a CO modem 400 used as a "master" modem and adapted.to exchange signals across the communications link 12 with a CPE modem used as a "slave" modem. It should be understood that the opposite arrangement is possible, whereby the CPE modem is the master and the CO modem 400 is the slave. It is noted that signals exchanged between the CO modem 400 and the CPE modem may be corrupted by recurring impulsive noise on link 12.

The CO modem 400 comprises a hybrid 403 for interfacing with the-link 12. The hybrid 403 is connected both to a receiver 405 and to a transmitter 410, and comprises circuitry for allowing signals to be simultaneously transmitted and received on the link 12, although preferably in different frequency regions (known respectively as the transmit band and the receive band). In this embodiment, the transmit band refers to the frequency region used for transmitting downstream signals and the receive band refers to the frequency region used for receiving upstream signals.

The receiver 405 comprises circuitry for sampling and filtering the upstream analog signal received from the hybrid 403 and down-converting it to baseband. The resulting upstream baseband digital signal is fed to a demodulator 415. This upstream baseband digital signal contains digitally modulated frames of the type shown in FIG. 2. The demodulator 415 comprises demodulation circuitry (e.g., QAM demodulation circuitry) for demodulating all the bits in each frame received from the receiver 405. The demodulator 415 feeds the demodulated frames of bits to an equalizer 446 via a data link 445.

The equalizer 446 is used to counteract the effects of amplitude and phase distortion introduced by the channel (i.e., link 12). The equalizer 446 can be implemented in many ways, such as a decision feedback equalizer comprising an arrangement of digital filters interconnected in a feedback pattern. The equalizer feeds a set of equalized bits to a decoder 440 along a data link 447. In addition, the equalizer 446 feeds an error signal to an SNR measurement module 448 along a control link 449. Such an error signal is readily available when a decision feedback equalizer 446 is used. The SNR measurement module 448 can be of standard design and includes circuitry or software for integrating or otherwise processing the error signal over a period of time, typically 512 symbol intervals. The SNR measurement module 448 feeds the measured value of the SNR to a baseband digital interface 430 along a control link 449A.

The decoder 440 is a hardware (preferred), software or firmware entity which comprises synchronization circuitry for identifying the frame boundaries using the bits in the synchronization field 205A of each received frame. The decoder 440 also comprises an error detector connected to an error counting element. The error detector is preferably made up of circuitry or software for reversing an encoding process performed by a counterpart baseband digital interface located in the CPE modem. An example of an encoding process is the CPE modem placing the result of a cyclic redundancy check in the error correction field 215 of each frame transmitted upstream. When this process is reversed at the decoder 440 in the CO modem 400, erroneous frames can be detected and discarded. The decoder 440 provides, on a frame-by-frame basis, a set of error-free bits to the baseband digital interface 430 along a data link 450.

It is to be understood that the error detector in the decoder 440 may additionally be equipped with an error correction unit. The error correction unit may consist of a convolutional decoder and/or a maximum-likelihood sequence estimator. In other embodiments of the invention, the error correction unit may comprise circuitry or software for recovering from channel-induced errors by performing operations on the bits in the error correction field 215 of each received frame.

Continuing with the description of the decoder 440, the error counting element therein is updated each time an error is detected by the error detector. Preferably, the error counting element is implemented as an error count register which is incremented each time a frame error is detected by the error detector. The value of the error count register is made available to the baseband digital interface 430 via a control link 455.

The baseband digital interface 430 is preferably a software entity implementable as a program running on a micro-processor and having access to a random-access memory. The program may be stored in ROM or on a storage medium such as a diskette, tape or CD-ROM. The baseband digital interface 430 may be part of the same piece of software as the decoder 440, in which case data link 450 and control link 455 could be logical links. Alternatively, the baseband digital interface 430 may be located in a centralized control unit external to the CO modem 400.

The baseband digital interface 430 is further connected to a modulator 465 by a data link 470 and by a control link 425. The data link 470 carries frames of data destined for the CPE modem. The modulator 465 comprises circuitry for modulating the frames received from the baseband digital interface 430 along data link 470 according to a modulation scheme. An example of a suitable modulation scheme is QAM, although other digital modulation schemes could be used, including, for example, discrete multi-tone (DMT), carrierless amplitude and phase (CAP), phase shift keying (PSK), differential PSK and frequency shift keying (FSK).

Preferably, the modulation level used by the modulator 465 can be controllably increased or decreased. To this end, the modulator 465, which is preferably a QAM modulator, is equipped with circuitry for adjusting the QAM level according to commands received from the baseband digital interface 430 via control link 425. In one embodiment, the range of possible QAM levels may include 4-QAM, 16-QAM, 64-QAM and 256-QAM. The modulator 465 feeds the resulting digitally modulated downstream symbols to the transmitter 410.

The symbol rate of downstream symbols leaving the modulator 465 and entering the transmitter 410 may be fixed or variable. If the symbol rate is variable, it may be selected as a function of whether the CO modem is operating in a narrowband or wideband mode. In any event, for the purposes of describing the present invention, it can be assumed that the symbol rate is fixed and that the line rate varies in tandem with the modulation level of the modulator 465 as controlled by the baseband digital interface 430 via control link 425.

Finally, the transmitter 410 comprises circuitry for frequency up-converting, filtering and digital-to-analog conversion of the digitally modulated downstream symbols received from the modulator 465 so that the resulting downstream analog signal destined for the CPE modem appears in a desired frequency band, typically having a lower frequency above 10 kHz. The resulting downstream analog signal destined for the CPE modem appears on the link 12 after suitable analog processing is applied by the hybrid 403.

In operation, the receiver 405, demodulator 415, equalizer 446 and decoder 440 function in a suitable way to deliver error-free frames of bits to the baseband digital interface 430. It is recalled that each such frame consists of a header field (containing a synchronization field, a frame information field and a communication channel field), a payload field and an error correction field. The bits received via the payload field contain data from the CPE modem which is destined either for the network 60 or for another CPE modem. The bits received via the communication channel field of certain frames contain indicators of downstream line quality as sent by the CPE modem, such as the measured SNR and the value of an error count register.

Furthermore, the decoder 440 allows the baseband digital interface 430 to access its own error count register via control link 455. As previously discussed, the error count register in the decoder 440 keeps track of the number of frame errors received in the upstream direction. In addition, the SNR measurement module 448 functions in a suitable way to provide the baseband digital interface 430 with the measured value of the SNR in the upstream direction via control link 449A.

The baseband digital interface 430 is programmed to process the various types of received information in the following way. Firstly, the bits in the payload field of each upstream frame are forwarded to the switch 50, which has knowledge of the frame's destination and accordingly sends the bits either to the network 60 or to another CPE modem via a respective CO modem. In the opposite direction, data received from the switch 50 and destined for the CPE modem is arranged into segments corresponding in length to the length of the payload field. The baseband digital interface 430 then appends a header field and an error correction field to each such payload field, forming a frame, and forwards the frame to the modulator 465 along data link 470.

Figure 9:
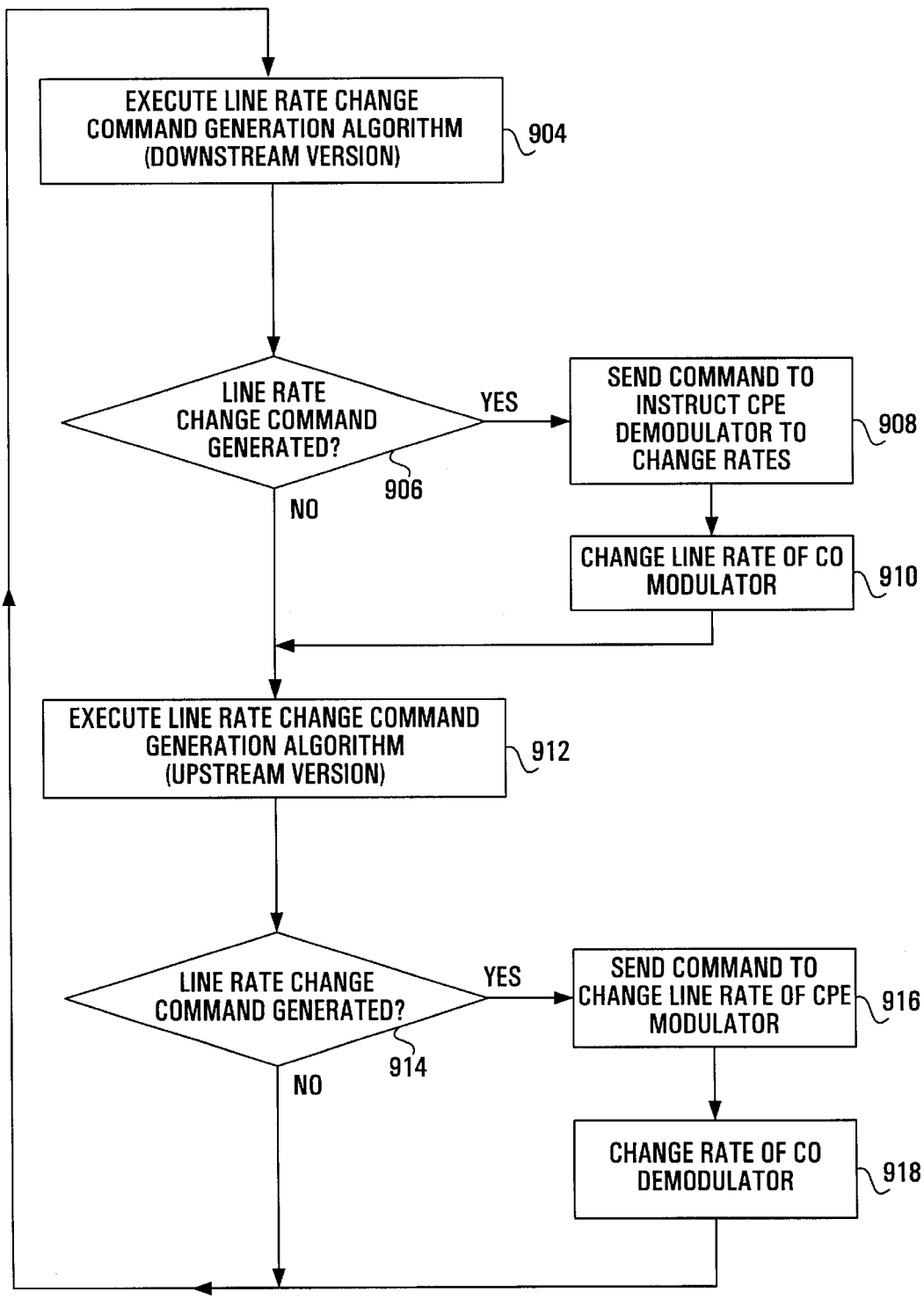
FIG. 9 is a flowchart illustrating a line rate control algorithm executed by the baseband digital interface in the CO modem.

The baseband digital interface 430 is also programmed to execute a line rate control algorithm now described with further reference to the flowchart of FIG. 9. The line rate control algorithm is preferably implemented as a piece of software, e.g., as a sub-routine, within the software of the baseband digital interface 430. For instance, if the baseband digital interface 430 is programmed in the C language as a sequence of endlessly repeating sub-functions in the MAIN function, then the line rate control algorithm could be one of these sub-functions.

At step 904, the baseband digital interface 430 executes a first (downstream) version of a line rate change command generation algorithm. This algorithm will be described later in further detail, but essentially consists of determining the quality of the line in the downstream direction and possibly generating a command to change the downstream line rate.

The line quality may be determined as a function of line quality indicators received from the CPE modem via the communication channel field of received upstream frames. These indicators of downstream line quality, which may include the measured downstream SNR and the value of an error count register in the CPE, are stored at respective locations in random access memory upon receipt by the baseband digital interface 440. The contents of these memory locations are updated (over-written) with each new receipt of the line quality indicators.

In order to have the CPE,modem send the line quality indicators, step 904 preferably involves the generation of a command requesting the transmittal of line quality indicators by the CPE modem. This command could be inserted into the communication channel field of one or more of the downstream frames being forwarded to the modulator 465 along data link 470. (It is recalled that the payload field of downstream frames contains data from the switch 50.) Alternatively, a command requesting the transmittal of line quality indicators could be sent to the CPE modem via an independent logical or physical communication channel.

At step 906, a different flow is taken depending on whether a line rate change command was or was not generated at step 904. If a command to change the downstream line rate was not generated, then the line rate control algorithm proceeds to step 912. Otherwise, i.e., if a command to change the downstream line rate was generated, the line rate control algorithm proceeds to step 908.

At step 908, a preparation command instructing the CPE modem demodulator to prepare for a change in the downstream line rate is send to the CPE modem. This preparation command can be inserted into the communication channel field of one or more of the downstream frames being forwarded to the modulator 465 along data link 470. In an alternate embodiment of the invention, step 908 may consist of sending the preparation command to the CPE modem via an independent logical or physical communication channel.

At step 910, the command to change the line rate, as generated at step 904, is forwarded to the modulator 465 along control link 425. The line rate change command may be formatted by the baseband digital interface 430 to specifically instruct the modulator 465 to change its modulation level and/or its symbol rate.

At step 912, the baseband digital interface 430 executes a second (upstream) version of the line rate change command generation algorithm. As a result of executing this second version of the algorithm (which will be described in further detail later on), the quality of the line in the upstream direction is assessed and a command to change the upstream line might be generated. The line quality may be determined as a function of line quality indicators measured at the CO modem. These indicators of upstream line quality preferably include the value of the error count register in the decoder 440 and the output of the SNR measurement module 448.

At step 914, a different flow is taken depending on whether a line rate change command was or was not generated at step 912. If a command to change the upstream line rate was not generated, then the line rate control algorithm returns to step 904. Otherwise, i.e., if a command to change the upstream line rate was generated at step 912, then the line rate control algorithm of the invention proceeds to step 916.

At step 916, the command to change the upstream line rate is sent to the CPE modem. This command can be inserted into the communication channel field of one of the downstream frames being forwarded to the modulator 465 along data link 470. In an alternate embodiment of the invention, step 916 may consist of sending the line rate adjustment command generated at step 912 to the CPE modem via an independent logical or physical communication channel.

Finally, at step 918, the rate used by the demodulator 415 in the CO modem 400 is changed in order to accommodate the change in the upstream line rate commanded at step 916. This can be achieved via a control line (not shown) connecting the demodulator 415 to the baseband digital interface 430. In an alternative embodiment of the invention, steps 916 and 918 could be executed in reverse order if there is a significant delay in the line rate change command being received and acted upon by the CPE modem.

With continued reference to FIG. 4, the modulator 465 receives frames from the baseband digital interface 430 along data link 470 and modulates these in accordance with a modulation level and a symbol rate that are modifiable by commands received from the baseband digital interface 430 via control link 425. Thus, the downstream line rate can be changed as a result of measurements made at the CPE modem and processed at the CO modem.

The structure of the CPE modem is now be described with reference to FIG. 3, in which there is shown a block diagram of a CPE modem 300 for communicating with the CO modem 400 of FIG. 4 across the link 12. Since it is preferably a slave modem rather than a master modem, the CPE modem 300 is designed to be responsive to line change commands generated by the CO modem 400.

The CPE modem 300 comprises a hybrid 303 for interfacing with the link 12. The hybrid 303 comprises circuitry for allowing signals to be transmitted and received simultaneously on the same set of wires. The hybrid 303 may be similar to the hybrid 400 in the CO modem 400 of FIG. 4, with the transmit and receive bands interchanged. The hybrid 303 is connected both to a receiver 305 and to a transmitter 310. The hybrid 303 provides a downstream analog signal to the receiver 305 and accepts an upstream analog signal from the transmitter 310.

The receiver 305 comprises circuitry for sampling and filtering the downstream analog signal received from the hybrid 303 and down-converting it to baseband. The resulting downstream baseband digital signal is fed to a demodulator 315. This downstream baseband digital signal contains digitally modulated frames of the type shown in FIG. 2. The demodulator 315 comprises demodulation circuitry (e.g., QAM demodulation circuitry) for demodulating all the bits in each frame received from the receiver 305. The demodulator 315 feeds the demodulated frames of bits to an equalizer 346 via a data link 345.

The equalizer 346 is used to counteract the effects of amplitude and phase distortion introduced by the channel (i.e., link 12). The equalizer 346 can be implemented in many ways, such as a decision feedback equalizer comprising an arrangement of digital filters interconnected in a feedback pattern. The equalizer 346 feeds a set of equalized bits to a decoder 340 along a data link 347. In addition, the equalizer 346 feeds an error signal to an SNR measurement module 348 along a control link 349. Such an error signal is readily available when a decision feedback equalizer 346 is used. The SNR measurement module 348 can be of standard design and includes circuitry or software for integrating or otherwise processing the error signal over a period of time, typically 512 symbol intervals. The SNR measurement module 348 feeds the measured value of the SNR to a baseband digital interface 330 along a control link 349A.

The decoder 340 is a hardware (preferred), software or firmware entity which comprises synchronization circuitry for identifying the frame boundaries using the bits in the synchronization field 205A of each received frame. The decoder 340 also comprises an error detector connected to an error counting element. The error detector is preferably made up of circuitry or software for reversing an encoding process performed by the baseband digital interface 430 in the CO modem 400. An example of an encoding process is the CO modem placing the result of a cyclic redundancy check in the error correction field 215 of each frame transmitted downstream. When this process is reversed at the decoder 340 in the CPE modem 300, erroneous frames can be detected and discarded. The decoder 340 provides, on a frame-by-frame basis, a set of error-free bits to the baseband digital interface 330 along a data link 350.

It is to be understood that the error detector in the decoder 340 may additionally be equipped with an error correction unit. The error correction unit may consist of a convolutional decoder and/or a maximum-likelihood sequence estimator. In other embodiments of the invention, the error correction unit may comprise circuitry or software for recovering from channel-induced errors by performing operations on the bits in the error correction field 215 of each received frame.

Continuing with the description of the decoder 340, the error counting element therein is updated each time an error is detected by the error detector. Preferably, the error counting element is implemented as an error count register which is incremented each time a frame error is detected by the error detector. The value of the error count register is made available to the baseband digital interface 330 via a control link 355.

The baseband digital interface 330 is preferably a software entity implementable as a program running on a micro-processor and having access to a random-access memory. The program may be stored in ROM or on a storage medium such as a diskette, tape or CD-ROM. The baseband digital interface 330 may be part of the same piece of software as the decoder 340, in which case data link 350 and control link 355 could be logical links.

The baseband digital interface 330 is further connected to a modulator 365 by a data link 370 and by a control link 325. The data link 370 carries frames of data destined for the CO modem 400. The modulator 365 comprises circuitry for modulating the frames received from the baseband digital interface 330 along data link 370 according to a modulation scheme. An example of a suitable modulation scheme is QAM, although other digital modulation schemes could be used, including, for example, discrete multi-tone (DMT), carrierless amplitude and phase (CAP), phase shift keying (PSK), differential PSK and frequency shift keying (FSK).

Preferably, the modulation level used by the modulator 365 can be controllably increased or decreased. To this end, the modulator 365, which is preferably a QAM modulator, is equipped with circuitry for adjusting the QAM level according to commands received from the baseband digital interface 330 via control link 325. In one embodiment, the range of possible QAM levels may include 4-QAM, 16-QAM, 64-QAM and 256-QAM. The modulator 365 feeds the resulting digitally modulated upstream symbols to the transmitter 310.

The symbol rate of upstream symbols leaving the modulator 365 and entering the transmitter 310 may be fixed or variable. If the symbol rate is variable, it may be selected as a function of whether the CPE modem 300 is operating in a narrowband or wideband mode. In any event, for the purposes of describing the present invention, it can be assumed that the symbol rate is fixed and that the line rate varies in tandem with the modulation level of the modulator 365 as controlled by the baseband digital interface 330 via control link 325.

Finally, the transmitter 310 comprises circuitry for frequency up-converting, filtering and digital-to-analog conversion of the digitally modulated upstream symbols received from the modulator 365 so that the resulting upstream analog signal destined for the CO modem 400 appears in a desired frequency band. The resulting upstream analog signal destined for the CO modem appears on the link 12 after suitable analog processing is applied by the hybrid 303.

In operation, the receiver 305, demodulator 315, equalizer 346 and decoder 340 function in a suitable way to deliver error-free frames of bits to the baseband digital interface 330. It is recalled that each such frame consists of a header field (containing a synchronization field, a frame information field and a communication channel field), a payload field and an error correction field. The bits received via the payload field contain data from the CO modem which is destined for the end user of the CPE unit. On occasion, the bits received via the communication channel field will contain commands to change the line rate used by the demodulator 315 or to change the upstream line rate used by the modulator 365. It is recalled that such commands, if generated, are sent by the CO modem 400 by virtue of steps 908 and 916 of the line rate control algorithm run by the baseband digital interface 430 in the CO modem 400.

Furthermore, the decoder 340 allows the baseband digital interface 330 to access its error count register via control link 355. This error count register keeps track of the number of frame errors received in the downstream direction. In addition, the SNR measurement module 348 functions in a suitable way to provide the baseband digital interface 330 with the measured value of the SNR in the downstream direction.

The baseband digital interface 330 is programmed to process the various types of received information in the following way. Firstly, the bits in the payload field of each downstream frame are forwarded to the end user. In the opposite direction, upstream data received from the end user is arranged into segments corresponding in length to the length of the payload field. The baseband digital interface 330 then appends a header field and an error correction field to each such payload field, forming a frame, and forwards the frame to the modulator 365 along data link 370.

Figure 10:
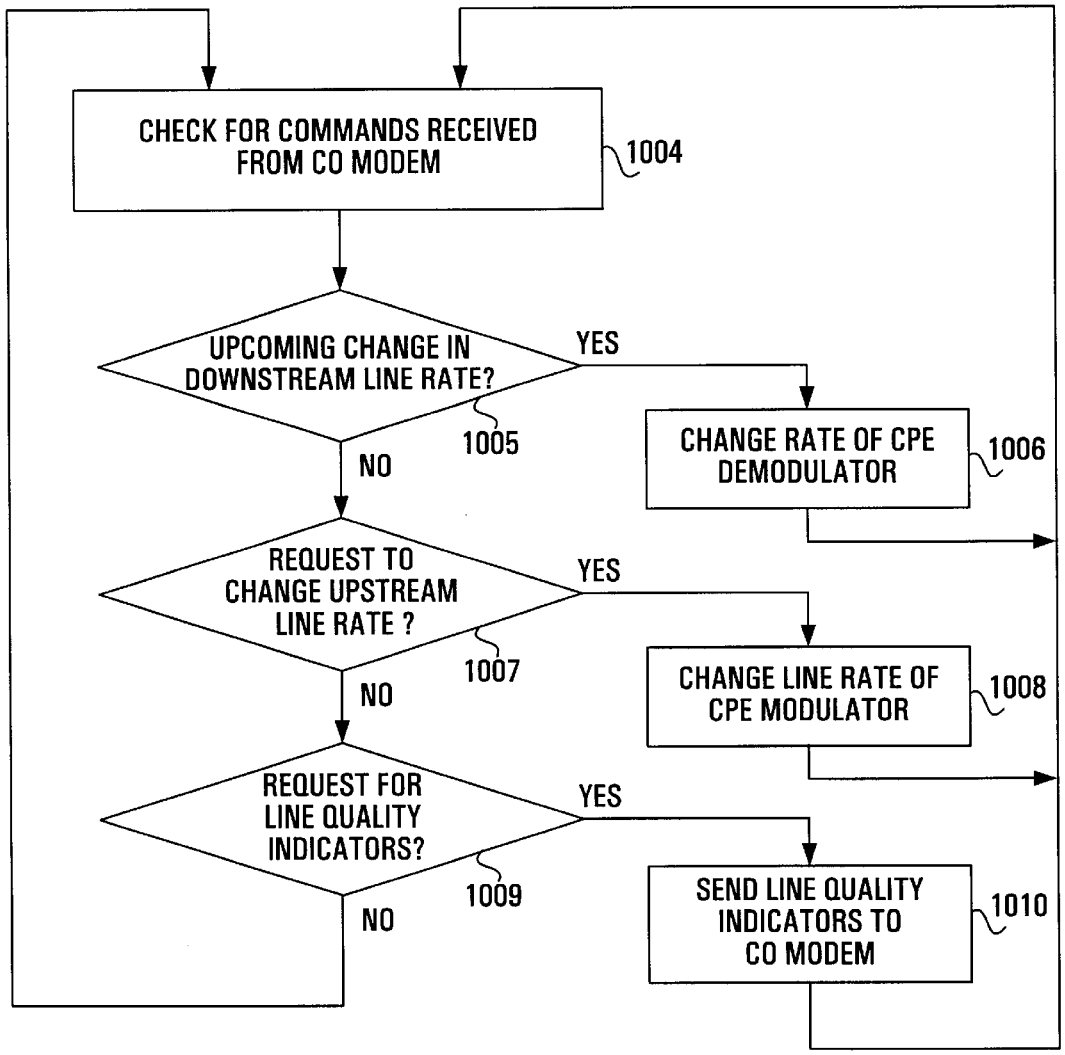
FIG. 10 is a flowchart illustrating a line rate control algorithm executed by a baseband digital interface in the CPE modem.

In addition, the baseband digital interface 330 is programmed to process the bits received in the communication channel field according to a line rate control algorithm now described with further reference to the flowchart shown in FIG. 10. The line rate control algorithm is preferably implemented as a piece of software, e.g., as a sub-routine, within the software of the baseband digital interface 330. For instance, if the baseband digital interface 330 is programmed in the C language as a sequence of endlessly repeating sub-functions in the MAIN function, then the line rate control algorithm could be one of these sub-functions.

At step 1004, the baseband digital interface 330 checks for commands received from the CO modem 400. This could be achieved by processing the bits in the communication channel of received downstream frames. Alternatively, if commands from the CO modem travel via a different physical or logical channel, such commands could arrive at the baseband digital interface 330 via separate suitable demodulation and decoding circuitry. Naturally, commands can only appear once they have been generated by the baseband digital interface 440 in the CO modem 400. Thus, if these commands are generated at irregularly spaced intervals, then they will be received with similar irregularity at the CPE modem 300.

If a command is indeed found to be received from the CO modem 400, such a command could be: (A) a preparation command advising of a change in the downstream line rate; (B) a command requesting a change in the upstream line rate; (C) a command requesting the transmittal of line quality indicators back to the CO modem.

At steps 1005 and 1006, if the received command is found to be a preparation command indicative of an upcoming change to the downstream line rate, then the baseband digital interface 330 accordingly sends instructions to the demodulator 315 to change the rate it is using to demodulate downstream frames. Such instructions could be fed by the baseband digital interface 330 to the demodulator 315 via a control link (not shown).

At steps 1007 and 1008, if the received command is found to be a request to change the upstream line rate, then the baseband digital interface forwards this command (possibly after having re-formatted it) to the modulator 365 along control link 325. The fact that the CPE modem 300 reacts to commands received from the CO modem 400 is an indication of the master-slave relationship existing between the two modems. As has been previously discussed, it is within the scope of the invention to allow the CPE modem to be the master or to allow each modem to be the master as far as one direction of communication is concerned.

Finally, at step 1010, if the received command requests the CPE modem 300 to transmit a set of line quality indicators pertaining to downstream line quality, then this set of line quality indicators is inserted into the communication channel field of selected upstream frames being forwarded to the modulator 365 along data link 370. These line quality indicators preferably include the output of the SNR measurement module 348 received along control link 349A and the value of the error count register provided by the decoder 340 along control link 355.

In an alternate embodiment of the invention, the line quality indicators could be transmitted at a rate that is independent of any commands received from the CO modem 400. Also, the pairs of steps (1005, 1006), (1007, 1008) and (1009, 1010) could be interchanged without affecting the basic functionality of the line rate control algorithm executed by the baseband digital interface 330.

Figure 3:
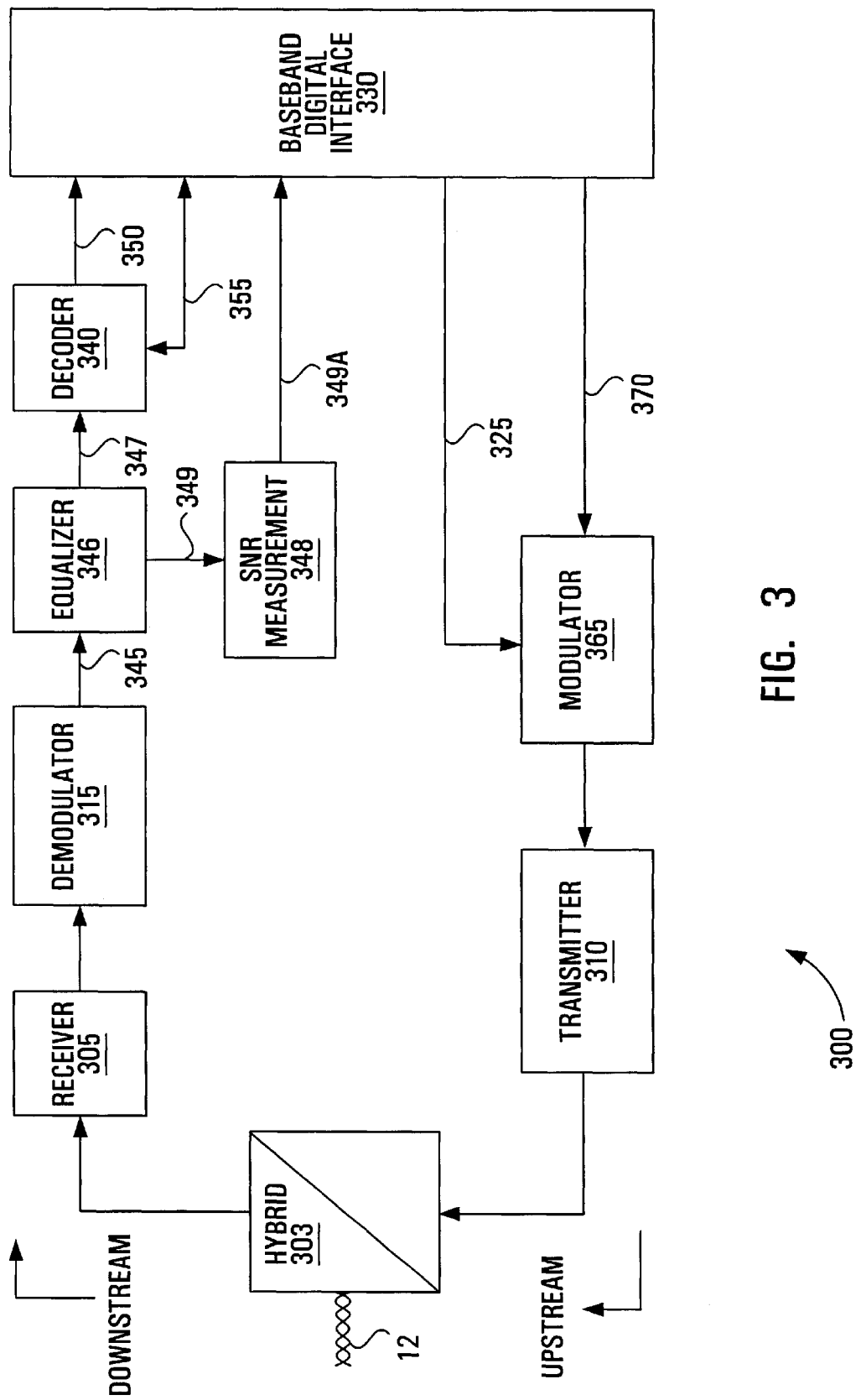
FIG. 3 is a detailed block diagram of a CPE modem.

With continued reference to FIG. 3, the modulator 365 receives frames from the baseband digital interface 330 along data link 370 and modulates these in accordance with a modulation level that is modifiable by commands received via control link 325. Thus, the upstream line rate can be modified as a result of measurements both made and processed at the CO modem.

Now that the basic structure and operation of the CO modem 400 and the CPE modem 300 have been described and illustrated, it is beneficial to consider exactly how the commands to change the line rate are generated by the baseband digital interface 440 in the CO modem 400. Thus, with further reference to FIG. 5, the line rate change command generation algorithm executed by the baseband digital interface 430 in the CO modem 400 (at steps 904 and 912 of FIG. 9) is now described.

Preferably, two separate, independent line rate change command generation algorithms are used, one for generating commands to change the upstream line rate (step 904) and one for generating commands to change the downstream line rate (step 912). Each of the two algorithms is preferably a sub-routine which is called whenever the respective step is executed by the baseband digital interface 440 in the CO modem 400.

The two versions of the line rate change command generation algorithm are basically identical, except for a slight difference in the way in which line rate quality is determined. Both versions rely on a measured value of the line SNR (from the appropriate SNR measurement module 448 or 348) as well as a value of the error count register (from the appropriate decoder 440 or 340). However, in the upstream version, the measured SNR is read directly from the SNR measurement module 448 via control link 449A and the value of the error count register is accessed directly from the decoder 440 via control link 455, while in the downstream version, the two line rate quality indicators are accessed from the locations in random access memory which are periodically filled based upon the received value of the measured downstream SNR and the received value of the error count register in the CPE modem.

Figure 5:
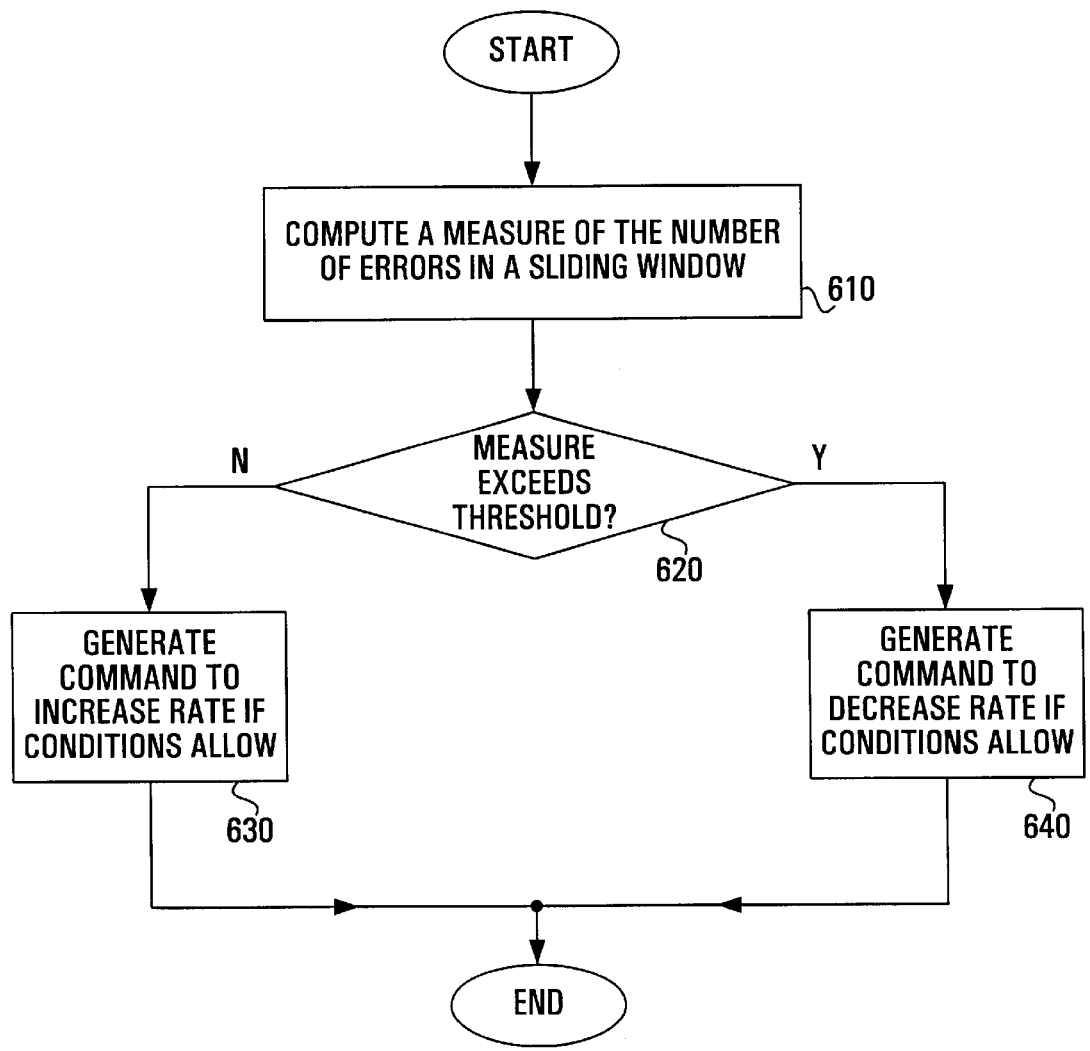
FIGS. 5 and 6 are, respectively, a high-level flowchart and a detailed flowchart showing a line rate change command generation algorithm executed by a baseband digital interface in the CO modem.

With reference to FIG. 5, therefore, either version of the line rate change command generation algorithm begins at step 610 by computing a measure of the number of frames received erroneously in a sliding time window. At step 620, the computed measure of the number of erroneously received frames in the sliding time window is compared to a threshold. If the computed measure does not exceed the threshold then, under certain conditions to be described herein below, a command to increase the line rate is generated at step 630. If, however, the computed measure does exceed the threshold then, under certain other conditions to be described herein below, a command to decrease the line rate is generated at step 640.

Figure 6:
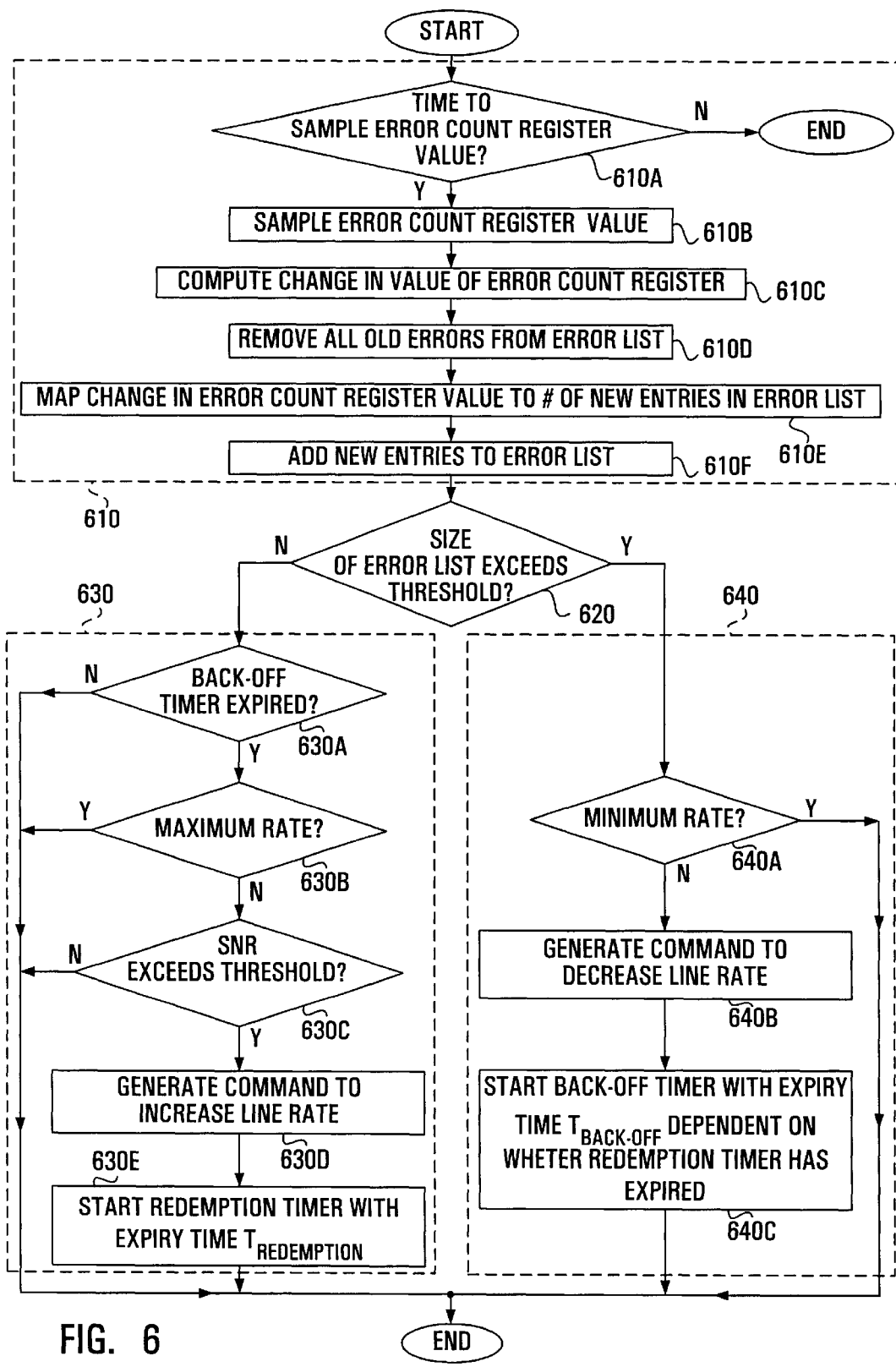

Reference is now made to FIG. 6, which illustrates in more detail the flow of the line rate change command generation algorithm according to the preferred embodiment of the present invention. Steps 610–640 of FIG. 5 have been expanded to reveal a greater amount of underlying detail. Specifically, step 610 comprises sub-steps 610A through 610F, step 630 comprises sub-steps 630A through 630E and step 640 comprises sub-steps 640A through 640C.

The illustrated algorithm involves reading values directly supplied by the SNR measurement module 448 and the error count register in the decoder 440 and therefore applies particularly to the "upstream" version, which is invoked each time step 904 of FIG. 9 is executed. Nevertheless, it will be apparent to those skilled in the art that it is a simple matter to change this algorithm in order to adapt it to the "downstream" version executed at step 912 of FIG. 9. Specifically, in the downstream version of the algorithm, line quality indicators are first requested and, after having been received from the CPE modem, are retrieved from locations in random access memory rather than directly from the SNR measurement module 448 and the decoder 440.

Referring to FIG. 6, therefore, at sub-steps 610A and 610B of step 610, the value of the error count register as accessed from the decoder 440 via control link 455 is sampled at selected sampling instants. Sampling in this manner is also known as "polling". The sampling instants at which the value of the error count register is sampled are spaced by intervals of at least one frame and could be distanced equally. Alternatively, the sampling instants could be variably spaced if, for instance, the software in the baseband digital interface 430 is preoccupied with other operational duties of a higher priority and is not able to sample exactly at predefined times. The interval between successive sampling instants is preferably between 1 second and 20 seconds.

If the current pass through the line rate change command generation algorithm does not result in sampling (polling) of the error count register, then the algorithm is exited. However, if the current pass through the line rate change command generation algorithm does indeed cause the error count register to be sampled then, at sub-step 610C, the baseband digital interface 430 computes the difference between the currently sampled value of the error count register and the previously sampled value of the error count register.

Based on the difference computed at sub-step 610C, the line rate change command algorithm then consists of computing a measure of the number of frame errors having occurred in a sliding time window. This can be achieved by processing a data structure stored in memory (preferably random access memory). Examples of suitable data structures include an "error list" and an array, either of which can be updated occasionally by ridding the data structure of evidence of old errors and refreshing it when new errors are detected. In the preferred embodiment, an error list is used to keep track of the number of frame errors having occurred in a sliding time window.

Figure 7:
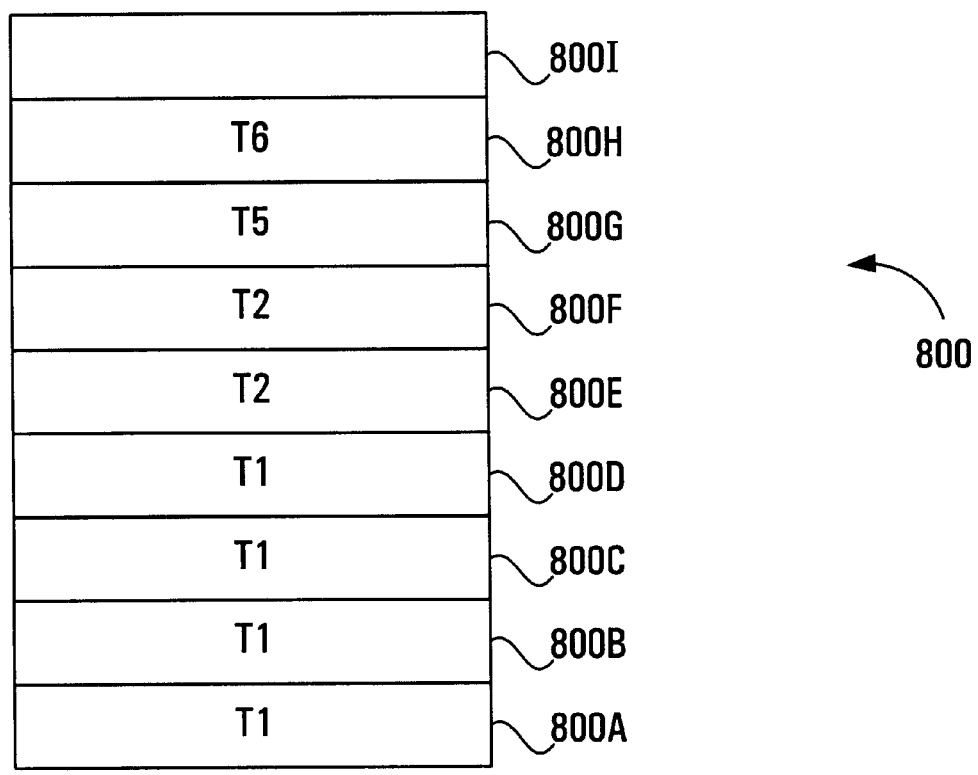
FIG. 7 depicts an error list maintained and updated by the baseband digital interface in the CO modem.

The error list is updated at sub-steps 610D, 610E and 610F as now described with additional reference to FIG. 7, which shows in more detail an example error list 800, consisting of a plurality of positions 800A through 800I. The number of positions, in this case equal to nine, is known as the "threshold" of the error list 800. Each position 800A–800I is either empty or contains an entry. Each entry has an associated time stamp. The number of entries with a time stamp $T_y$ corresponds to a measure of the number of erroneous frame errors that were received between sampling instants $T_x$ and $T_y$, with $T_x$ being the next most recent sampling instant after $T_y$.

In the example error list 800 shown in FIG. 7, positions 800A through 800D have entries with an associated time stamp $T_1$, positions 800E and 800F have entries with an associated time stamp $T_2$ (more recent than $T_1$), position 800G has an entry with an associated time stamp $T_5$ (more recent than $T_2$) and position 800H has an entry with an associated time stamp $T_6$ (more recent than $T_5$). Position 800I is vacant.

Whenever the difference between the currently sampled value of the error count register and the previously sampled value of the error count register (as computed at sub-step 610C) indicates that at least one new error has occurred, there may result the addition of one or more new entries in the error list 800. In one embodiment, it is possible to fill as many positions in the error list as there are additional errors. However, the occurrence of a large number of errors may be due a short-term phenomenon (on the order of microseconds or a few milliseconds) which could disappear by the next frame. Thus, it may be undesirable to have such a temporary event saturate the entire error list and bias an estimate of the line quality over the entire length of the sliding window.

Therefore, in the preferred embodiment, a many-to-one mapping is applied, which relates each possible difference in errors (as gathered from sub-step 610C) to a possibly smaller number of new positions to be filled in the error list. Such a mapping (or "filtering") operation serves to minimize the impact of localized errors on the global error count.

For example, given an error list with a threshold (i.e., a maximum size) of 9 such as the error list 800 in FIG. 7, the mapping may resemble the following:

| Difference in error count register | Number of new entries filled |
|---|---|
| 0 | 0 |
| 1–2 | 1 |
| 3–5 | 2 |
| 6 or more | 3 |

It is seen that if 6 or more frames have been erroneously received since the previous sampling instant, then although the link is deemed to be in poor shape, only ⅓ of the error list is actually affected by this result. In other words, if the error list was empty before the present sampling instant and if the link quality improves within the next two sampling instants, then the threshold will not be reached and the link will be deemed to have recovered.

Regardless of whether or not a mapping is used to relate the actual number of errors occurring since the last sampling instant, newly filled positions in the error list are preferably time stamped with the current sampling instant.

Removal of "old" entries from the error list (step 610D) is now considered. In the case of equally spaced sampling instants, an "old" time stamp refers to a time stamp corresponding to an error having occurred more than a predetermined number of sampling instants ago, while in the case of irregularly spaced sampling instants, an "old" time stamp is one which has occurred more than a certain number of seconds ago. This results in the recording of time stamps which span a sliding time window of a definable duration. Preferably, this duration is greater than the length of time over which an SNR measurement is produced. A suitable duration for the sliding time window is on the order of several minutes.

Figure 8:
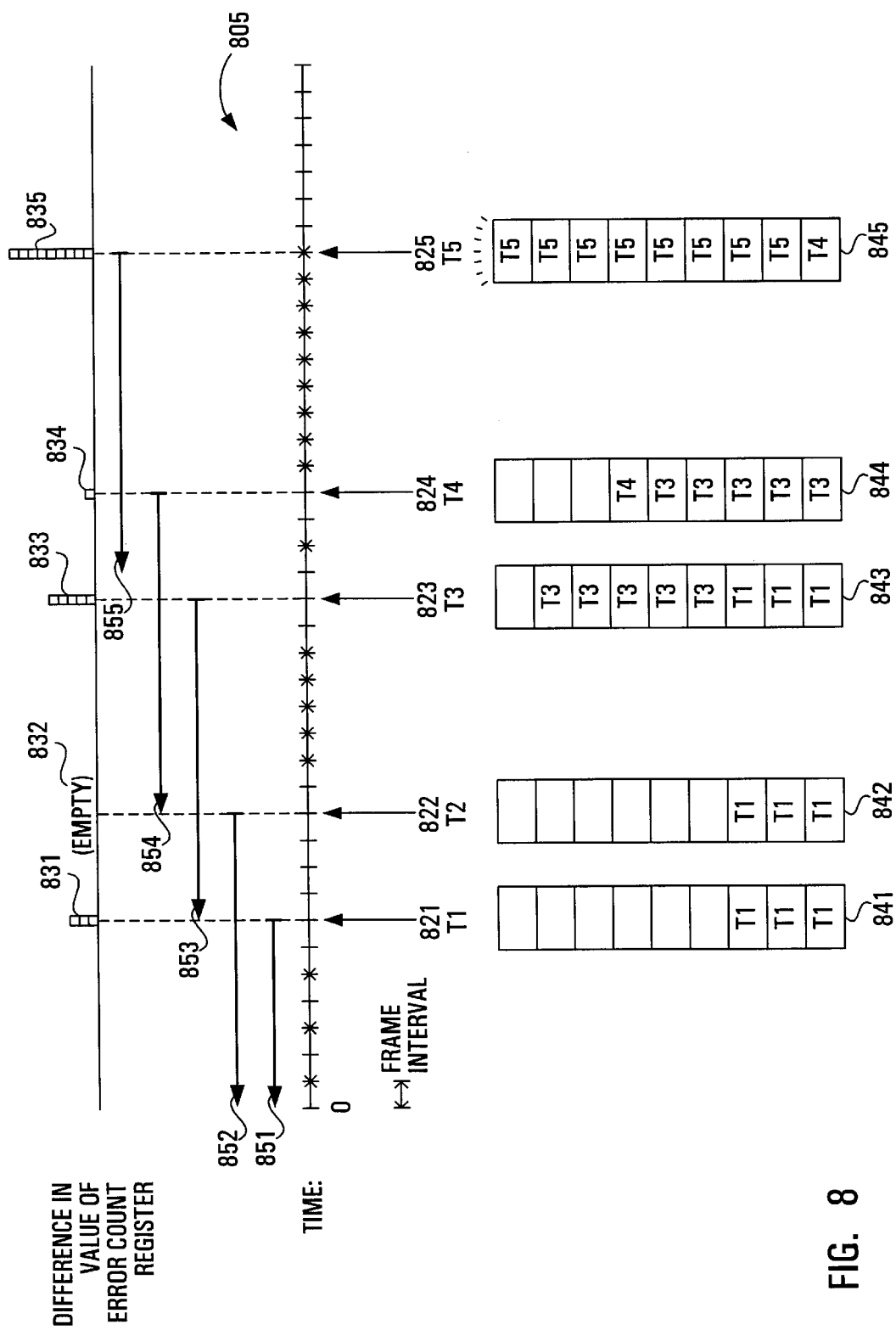
FIG. 8 shows an example of the evolution of an error list over time.

To illustrate the progression of an error list as a function of time, i.e., through multiple samplings of the error count register, reference is now made to FIG. 8. Specifically, a time axis 805 is provided with a degree of granularity corresponding to that of individual received frames. Frames that are incorrectly received are marked with an "X" on the time axis 805. Furthermore, there are five sampling instants, which are marked with arrows and are given reference numerals 821–825. The sampling instants 821–825 are unevenly spaced although in other cases, the interval between sampling instants could be constant.

In addition, FIG. 8 shows five stacks 831–835 representing the difference between the current and previous values of the error count register as determined by the baseband digital interface 430 at sub-step 610C at respective ones of the sampling instants 821–825. Furthermore, five instances of the error list are shown at 841–845, each corresponding to the state of the error list immediately following a respective one of the sampling instants 821–825.

In FIG. 8, an error list having a threshold of 9 entries is assumed, as is a sliding window size of 12 frames. The window covered by each sampling instant 821–825 is represented by a respective horizontal bar 851–855. None of the windows 851–855 extends past time zero (to the far left of the time axis 805). Another assumption is that the error list is empty at time zero. Moreover, no special mapping is used to relate the number of newly detected errors to a number of new entries in the error list. Thus, there is a one-to-one correspondence between the difference in the value of the error count register between the current and previous sampling instants (as computed at sub-step 610C and shown by stacks 831–835) and freshly filled positions in the error list.

Beginning at sampling time 821, therefore, it is seen from stack 831 that three new errors have occurred since time zero. Thus, instance 841 of the (previously empty) error list contains three fields with a time stamp of $T_1$, corresponding to sampling instant 821.

Next, between sampling instants 821 and 822, no new frame errors are found to have occurred. Therefore, the value of the error count register does not change and stack 832 is empty. The error list 842 remains unchanged since entries with a time stamp $T_1$ are still within the reach of window 852, although such entries in instance 842 of the error list represent slightly "older" errors than in error list 841.

Next, at sampling instant 823, stack 834 shows that five new errors have occurred since sampling instant 822. Therefore, error list 843 contains five new entries with a time stamp $T_3$. The slightly "older" errors represented by time stamp 821 in instance 843 of the error list are still present in instance 843 of the error list because window 853 reaches as far back as sampling instant 821.

At sampling instant 824, stack 834 shows that the difference in the sampled values of the error count register is found to be unity and therefore instance 844 of the error list contains one new entry with a time stamp $T_4$. However, entries having a time stamp $T_1$ have been deleted from instance 844 of the error list because window 854 extends only as far back as sampling instant $T_2$.

Finally, nine errors occur between sampling instants 824 and 825. This is reflected by stack 835, which is nine-high. Since window 855 reaches back to between sampling instants 823 and 824, only those errors with a time stamp $T_4$, i.e., occurring between sampling instants 824 and 825, will qualify for a spot in instance 845 of the error list. Entries having a time stamp $T_3$ are outside window 855 and are therefore cleared. Since the threshold of-the error list is nine, and since the number of new errors plus those having a time stamp $T_4$ is ten, the instance 845 of the error list has been saturated and has in fact overflowed.

To conserve memory, it is preferable to remove old entries having a time stamp $T_3$ from the error list before adding new ones having a time stamp $T_5$. More generally, at any particular sampling instant, it is preferable to perform the removal of old errors from the error list prior to the addition of new errors to the error list. Nevertheless, it is within the scope of the present invention to remove the old entries subsequent to the addition of new entries.

Referring back to step 620 shown in FIGS. 5 and 6, the action to be taken after updating the error list following each sampling instant depends on the number of vacant positions in the error list. If there are one or more vacancies in the error list, then step 630 is to be followed; otherwise, if there are no vacancies and/or if the error list has overflowed, step 640 is to be followed.

In principle, step 630 (consisting of sub-steps 630A–630E) involves generating a command to increase the line rate under certain conditions which are partly dictated by the status of two timers, namely a "back-off" timer and a "redemption" timer, having selectable expiry times, denoted $T_{BACK-OFF}$ and $T_{REDEMPTION}$, respectively. The set of possible values for $T_{BACK-OFF}$ lies between a minimum non-zero expiry time and a maximum expiry time, with one or more intermediate expiry times lying between the two extremes. The spacing among the possible values for $T_{BACK-OFF}$ is preferably exponentially distributed. The value of $T_{REDEMPTION}$ could be set to a constant value (e.g., 1 hour) alternatively, the value of $T_{REDEMPTION}$ could reflect the value chosen for $T_{BACK-OFF}$.

Both $T_{BACK-OFF}$ and $T_{REDEMPTION}$ are given default non-zero. values, preferably the minimum value in the respective range. It should be understood that both the back-off timer and the redemption timer run continuously unless they have expired or have been stopped.

Sub-step 630A of step 630 consists of verifying the status of the back-off timer. If the back-off timer has expired (sub-step 630A) and if the downstream line rate is currently not at its maximum value (sub-step 630B), then the baseband digital interface 430 generates a command to increase the upstream line rate (sub-step 630D). Preferably, an added condition must be satisfied at sub-step 630C. Namely, the measured SNR as provided by the SNR measurement module 448 along control link 449A is required to be sufficiently high to allow a rate increase to occur. If a command to increase the line rate is indeed generated at step 630D as a:result of having met the conditions stipulated by steps 630A, 630B and 630C (if applicable), then the redemption timer is started (sub-step 630E).

Step 640, on the other hand, essentially consists of sub-steps 640A–640C, which may result in the generation of a command to decrease the upstream line rate under certain conditions. Specifically, if the current downstream line rate is not at its minimum value (sub-step 640A), then the baseband digital interface 430 generates a command to decrease the line rate (sub-step 640B). It is noted that SNR measurements are not relied upon for generating commands to decrease the line rate.

Next, the back-off timer is re-started with a new value of $T_{BACK-OFF}$ (sub-step 640C). The value assigned to $T_{BACK-OFF}$ at sub-step 640C depends on whether or not the redemption timer has expired. If the redemption timer has indeed expired, i.e., if the line has been operating without major problems for at least the duration of the redemption timer, then $T_{BACK-OFF}$ is decreased (unless the minimum expiry time has been reached). Otherwise, if the redemption timer has not expired, i.e., if errors begin to occur within a short amount of time after a line rate increase, then $T_{BACK-OFF}$ is increased (unless the maximum expiry time has been reached).

In summary, both versions of the line rate change command generation algorithm of the present invention provide the following functionality and advantages over existing approaches:

(i) The use of a sliding time window captures variations in the line quality over an extended period of time. Thus, it is possible to capture significant disturbances which might be missed if conventional SNR-based measurements are relied upon. As a result, the line rate will be downgraded in situations where it should be downgraded but where, conventionally, it may not have been. This leads to higher data throughput as the transmitted data will be less prone to corruption at the lower rate.

(ii) The measure of the number of frames received in error is computed by dividing the time window into sampling instants and applying a many-to-one mapping to the actual number of frame errors received between adjacent sampling instants. Thus, insignificant short-term disturbances are eliminated. As a result, the line rate will not be downgraded in situations where it should not be downgraded but where, conventionally, it may have been. This leads to a reduced incidence of thrashing, which results in higher data throughput as less time is lost in preparing for line rate changes.

(iii) A back-off timer may be used for preventing an upgrade in line quality to follow directly on the heels of a downgrade, further decreasing the incidence of thrashing and further improving the data throughput.

(iv) A redemption timer may be used for controlling the expiry time of the back-off timer. Thus, the expiry of the back-off timer can be increased if the line rate, once upgraded, does not stay acceptable for more than the duration of the redemption timer. This has the advantage of further reducing the incidence of "thrashing" in cases where the line rate is consistently poor but undergoes occasional improvements, leading to further improved data throughput.

It is noted that according to the preferred embodiment of the present invention, at least $T_{BACK-OFF}$ seconds must elapse before the generation of a command to decrease the line rate can be followed by the generation of a command to increase the line rate. However, the line rate change command generation algorithm leaves open the possibility of generating a pair of closely spaced commands, which could represent an increase followed by an increase, an increase followed by a decrease or a decrease followed by a decrease.

In an alternative embodiment, the algorithm could be easily modified by one skilled in the art to prevent a decrease from following immediately on the heels of an increase, which even further reduces the incidence of thrashing. Moreover, it is possible to design the algorithm such that a second increase cannot follow a previous increase until a predetermined amount of time has elapsed.

It should also be understood that the error list 800 described with reference to FIG. 7 may be built and maintained using any suitable software technique. For example, the error list may simply consist of a table containing entries, with each entry identifying a value and a time stamp. The value could correspond to the result of applying the mapping to the difference value computed in sub-step 610C, while the time stamp could correspond to the current sampling instant. In this way, the measure of the number of frame errors occurring in the sliding time window could be calculated by adding the "values" identified by those entries whose "time stamp" is inside the window.

Moreover, if the sampling instants are equidistant, it is possible to implement a sliding time window using an array, without having to time-stamp the elements of the array. For example, the whole time window can be covered by an array of elements, with each element representing a respective time interval of equal duration existing between two sampling instants. In each element of the array is stored a measure of the number of new errors that have occurred in the respective time interval. At each sampling instant, the oldest element is simply deleted and a new element is filled with a measure of the number of new errors that have occurred in the most recent time interval. All the elements of the array are then added and the total value is checked against the threshold.

Those skilled in the art will also appreciate that the size of the error list and the actual mapping applied can be customized to reflect different requirements or conditions such as the time interval between sampling instants, the maximum tolerable duration of a temporary disturbance and so on. Different mappings and error list thresholds could also be used at different sampling instants and for different line rates.

Moreover, in FIGS. 5 and 6, different thresholds can be used for triggering the execution of steps 630 and 640. For example, if a first threshold is exceeded, then step 640 could be executed and if a second threshold lower than the first threshold is not exceeded, then step 630 could be executed. The introduction of such hysteretic behaviour causes line rate increases to occur less frequently if the conditions on the line are such that the data structure is filled to an intermediate degree lying between the two thresholds.

According to still other embodiments of the invention, the CO and CPE modems 400, 300 may perform more elaborate tasks, such as interleaving/de-interleaving and partial response filtering. Also, either modem may be an integral part of a more sophisticated communications device at the respective end of the communications link.

While the preferred embodiment of the invention has been described and illustrated, it will be apparent to those skilled in the art that numerous variations and modifications can be made without departing from the scope of the invention as defined in the appended claims.

We claim:

1. A method of monitoring the quality of a communications link used to transmit frames of digital information at a controllable line rate, the method comprising:

down-converting to baseband a digitally modulated received signal;

demodulating from the received signal a digital signal comprising frames each containing at least a header field and a payload field;

synchronizing with a bit pattern in the header field of each frame;

computing a measure of the number of frames received in error in a sliding time window; and generating a command to change the line rate as a function of said measure.

2. A method of monitoring the quality of a communications link used to transmit frames of digital information at a controllable line rate, the method comprising:

receiving frames of digital information;

computing a measure of the number of frames received in error in a sliding time window by:
   A) determining the number of frames received in error between a present sampling instant and a previous sampling instant;
   B) if at least one erroneously received frame is found at step A), filling zero or more entries in a data structure stored in memory; and
   C) clearing previously filled entries associated with errors falling outside the sliding time window;

wherein said measure is related to the contents or the number of filled fields of the data structure; and generating a command to change the line rate as a function of said measure.

3. A method as claimed in claim 2, wherein step A) comprises periodically sampling an error counting element and computing the difference between the value of the error counting element sampled at the present sampling instant and the value of the error counting element sampled at the previous sampling instant.

4. A method as claimed in claim 3, wherein the error counting element is an error count register.

5. A method as claimed in claim 3, wherein said sampling instants are separated by constant intervals.

6. A method as claimed in claim 3, wherein said sampling instants are separated by variable intervals.

7. A method as claimed in claim 3, wherein each frame comprises at least a payload field and an error correction field, wherein the error counting element is updated each time a frame error is detected and wherein a frame error is detected by performing an operation on at least the payload field of said frame and comparing the result to the contents of the error correction field.

8. A method as claimed in claim 2,
   wherein step B) comprises using a mapping to translate the number determined at step A) to a number of newly filled entries in the data structure; and
   wherein said measure is equal to the number of filled entries in the data structure.

9. A method as claimed in claim 8, wherein the mapping is one-to-one.

10. A method as claimed in claim 8, wherein the mapping is many-to-one.

11. A method as claimed in claim 2,
    wherein step B) comprises using a mapping to translate the number determined at step A) to a value of a single new entry in the data structure; and
    wherein said measure is equal to the sum of the values of those entries of the data structure filled within the duration of the sliding time window.

12. A method as claimed in claim 11, wherein said value is less than or equal to said number.

13. A method as claimed in claim 11, wherein said value is equal to said number.

14. A method as claimed in claim 2, wherein step C) comprises clearing previously filled entries associated with errors occurring more than a predetermined number of seconds prior to the present sampling instant.

15. A method as claimed in claim 2, wherein step C) comprises clearing previously filled entries associated with errors occurring more than a predetermined number of sampling instants prior to the present sampling instant.

16. A method of monitoring the quality of a communications link used to transmit frames of digital information at a controllable line rate, the method comprising:

receiving frames of digital information;

computing a measure of the number of frames received in error in a sliding time window;

if said measure exceeds a first threshold and if the line rate currently used is not at a predetermined minimum value, then generating a command to decrease the line rate and starting a back-off timer having a controllable expiry time $T_{BACK\text{-}OFF}$; and if said measure does not exceed a second threshold and if the line rate currently used is not at a predetermined maximum value and if the back-off timer has expired, then generating a command to increase the line rate.

17. A method as claimed in claim 16, wherein the first and second thresholds are identical.

18. A method as claimed in claim 16, wherein the step of generating a line rate change command further comprises:

upon generation of a command to increase the line rate, starting a redemption timer having an expiry time $T_{REDEMPTION}$; and upon starting the back-off timer, verifying the status of the redemption timer and increasing the value of $T_{BACK\text{-}OFF}$ if the redemption timer has not expired.

19. A method as claimed in claim 16, wherein the step of generating a line rate change command further comprises:

upon generation of a command to increase the line rate, starting a redemption timer having an expiry time $T_{REDEMPTION}$; and upon starting the back-off timer, verifying the status of the redemption timer, increasing the value of $T_{BACK\text{-}OFF}$ if the redemption timer has not expired and decreasing the value of $T_{BACK\text{-}OFF}$ if the redemption timer has expired.

20. A method as claimed in claim 16, wherein the step of generating a command to change the line rate further comprises:

determining the signal-to-noise ratio (SNR) of the communications link; and generating said command to increase the line rate only if the SNR exceeds a predetermined threshold.

21. A method of monitoring the quality of a communications link used to transmit frames of digital information at a controllable line rate, wherein each frame comprises at least a header field, the method comprising:

receiving frames of digital information;

computing a measure of the number of frames received in error in a sliding time window;

generating a command to change the line rate as a function of said measure;

encoding said command into the header field of at least one frame transmitted to the remote communications device across the communications link;

sending a preparatory command to a remote communications device, said preparatory command being indicative of an upcoming change in the line rate.

22. A communications device for use in monitoring the quality of a communications link over which frames of digital information are transmittable at a controllable line rate, comprising:

means for exchanging frames of digital information with a second communications device;

means connected to the exchanging means, for computing a first measure of the number of frames received in error in a first sliding time window; and means connected to the exchanging means, for computing a second measure of the number of frames received in error in a second sliding time window by the second communications device; and means connected to the first computing means, for generating a first command to change the line rate as a function of said first measure;

means connected to the second computing means, for generating a second command to change the line rate as a function of said second measure;

means connected to the generating means, for transmitting said first command across the communications link; and means connected to the generating means, for changing the line rate according to said second command.

23. A communications device, comprising:

a receiver connected to a communications medium, for down-converting a received signal to baseband;

a demodulator connected to the receiver, for demodulating from the baseband signal a digital signal comprising frames of digital information;

a processing unit connected to the demodulator and adapted to receive frames of digital information from the demodulator, to compute a measure of the number of frames received in error in a sliding time window and to generate a line rate change command as a function of said measure;

a modulator connected to the processing unit, for digitally modulating the line rate change command; and a transmitter connected to the modulator and to the communications medium, for up-converting the digitally modulated line rate change command and transmitting it across the communications medium.

* * * * *